United States Patent
Boitel et al.

(10) Patent No.: US 6,839,487 B2
(45) Date of Patent: Jan. 4, 2005

(54) ATHERMAL, OPTICAL-FIBER DEVICE COMPRISING AN INTEGRATED COMPONENT

(75) Inventors: Michel Boitel, Perros Guirec (FR); Dominique Durand, Trebeurdem (FR)

(73) Assignee: Highwave Optical Technologies, Lannion (FR)

( * ) Notice: Subject to any disclaimer, the term of this patent is extended or adjusted under 35 U.S.C. 154(b) by 195 days.

(21) Appl. No.: 10/098,674

(22) Filed: Mar. 15, 2002

(65) Prior Publication Data

US 2002/0141701 A1 Oct. 3, 2002

(30) Foreign Application Priority Data

Mar. 16, 2001 (FR) ............................................. 01 03644

(51) Int. Cl.[7] ................. G02B 6/32; G02B 6/42
(52) U.S. Cl. ................................. 385/37; 385/31
(58) Field of Search ......................... 395/15, 31, 37

(56) References Cited

U.S. PATENT DOCUMENTS

| | | | | |
|---|---|---|---|---|
| 6,181,851 B1 | * | 1/2001 | Pan et al. | 385/37 |
| 6,377,727 B1 | * | 4/2002 | Dariotis et al. | 385/37 |
| 6,449,402 B1 | * | 9/2002 | Bettman et al. | 385/15 |
| 6,453,108 B1 | * | 9/2002 | Sirkis | 385/136 |
| 6,522,809 B1 | * | 2/2003 | Takabayashi et al. | 385/37 |
| 6,621,957 B1 | * | 9/2003 | Sullivan et al. | 385/37 |
| 2002/0141700 A1 | * | 10/2002 | Lachance et al. | 385/37 |
| 2002/0146230 A1 | * | 10/2002 | So | 385/137 |

FOREIGN PATENT DOCUMENTS

| | | |
|---|---|---|
| WO | WO 98/59267 | 12/1998 |
| WO | WO 99/47955 | 9/1999 |

OTHER PUBLICATIONS

1999 Optical Society of America; "Enhanced Thermal and magnetic actuations for broad-range tuning of fiber Bragg grating-based reconfigurable add-drop devices", H. Mavoori, et al., 2 pages.

* cited by examiner

*Primary Examiner*—John D. Lee
*Assistant Examiner*—Tina M Lin
(74) *Attorney, Agent, or Firm*—Blakely Sokoloff Taylor & Zafman

(57) ABSTRACT

The present invention relates to an optical-fiber device comprising at least one component (11) integrated into the fiber (10), and a support assembly on which the fiber (10) is fixed at two points (1322, 1332) situated respectively on either side of the integrated component (11), which support comprises at least two elements (120, 130, 132) possessing different thermal-expansion coefficients which are arranged functionally in series between the two points of fixing of the fiber, characterized in that the interface (131, 133) between the two elements (120, 130, 132) possessing different thermal-expansion coefficients is at least substantially perpendicular to the axis of the fiber (10), and in that the means for support of the optical fiber (10) comprise a support assembly consisting of three pieces (130, 120 and 132) arranged in series, in a Z-shaped geometry.

16 Claims, 4 Drawing Sheets

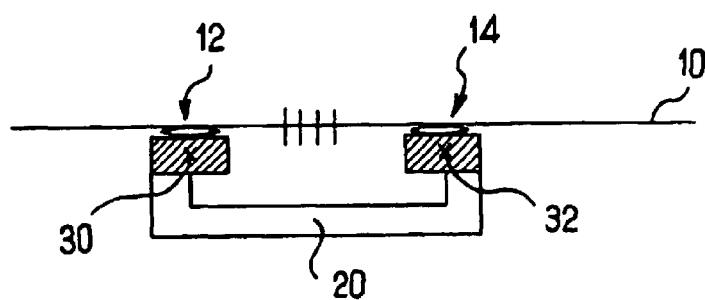
FIG_1
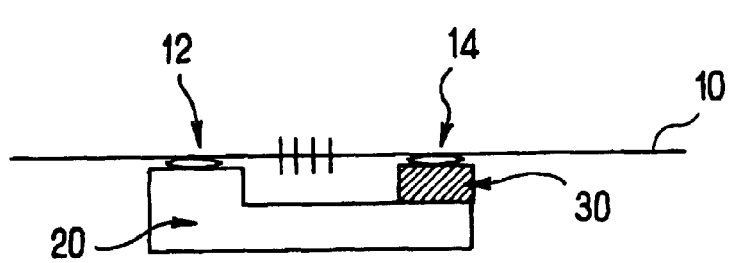
FIG_2
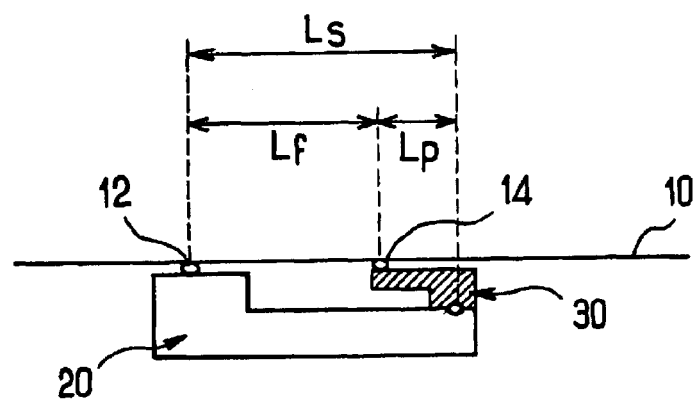
FIG_3
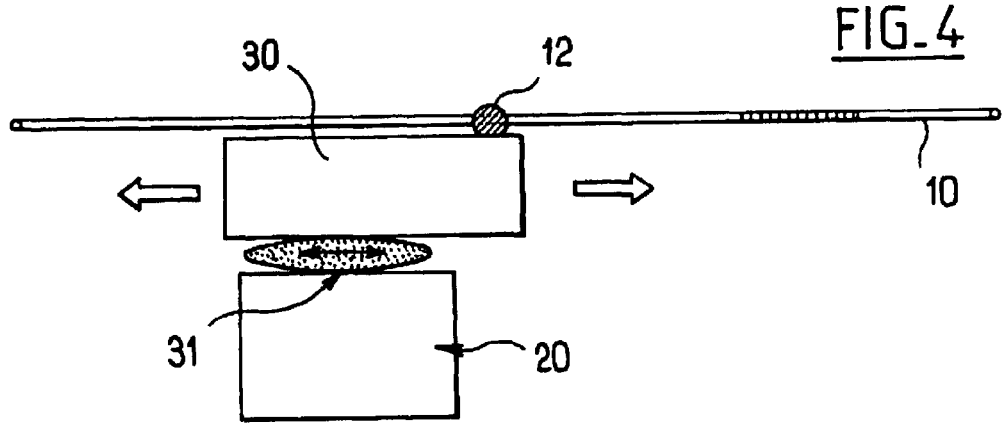
FIG_4

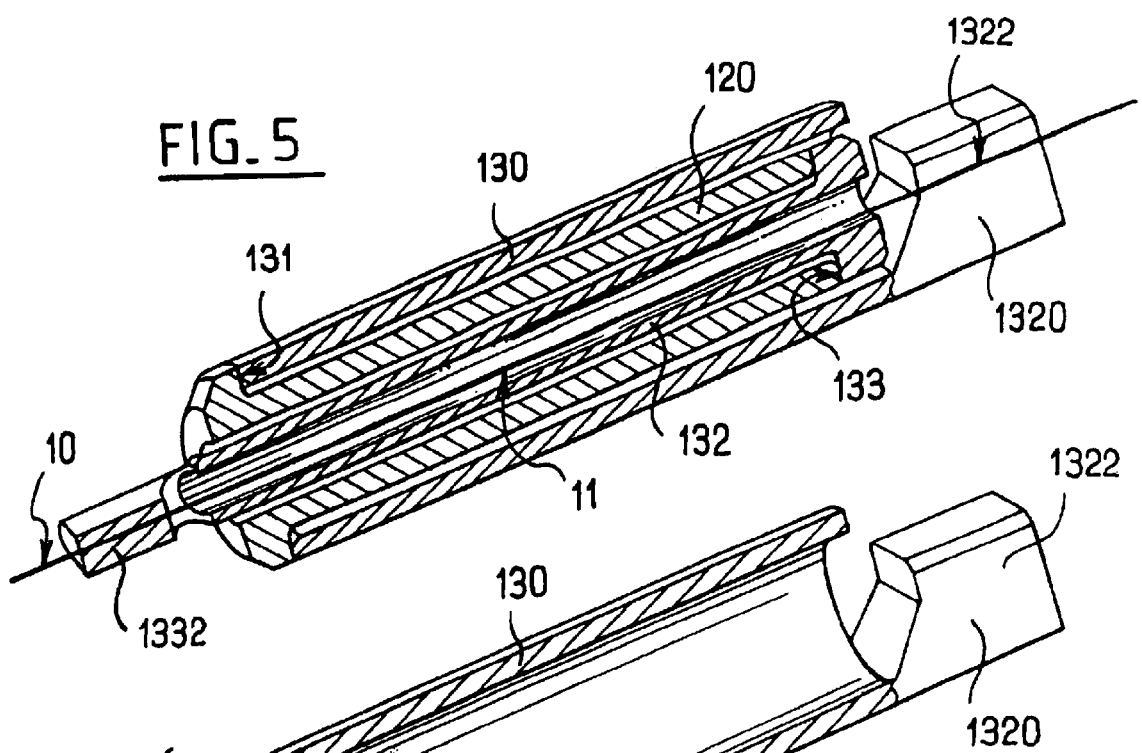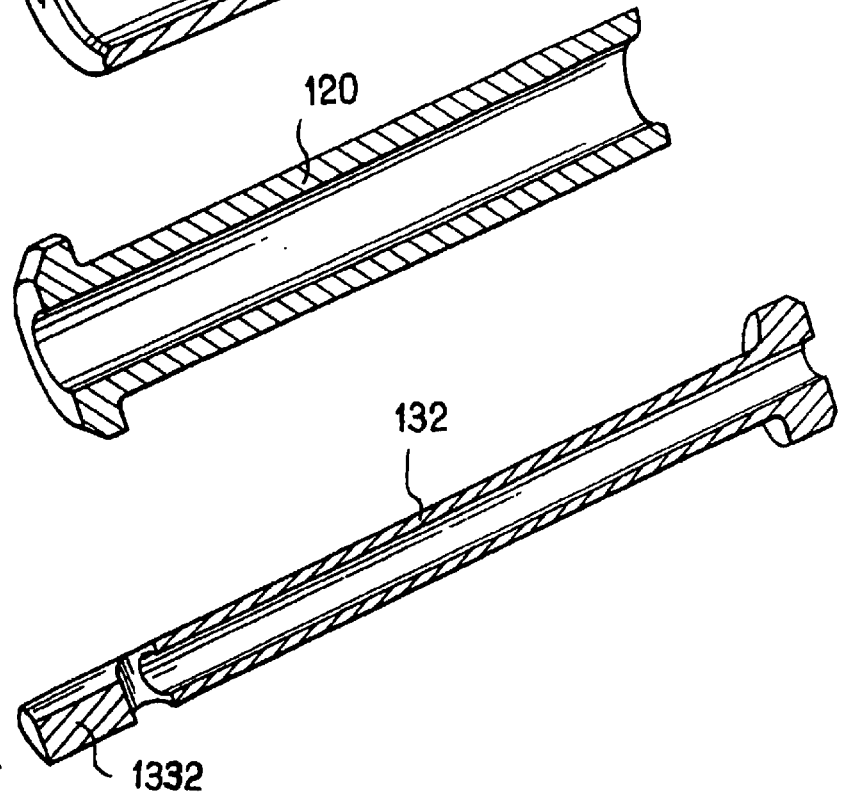

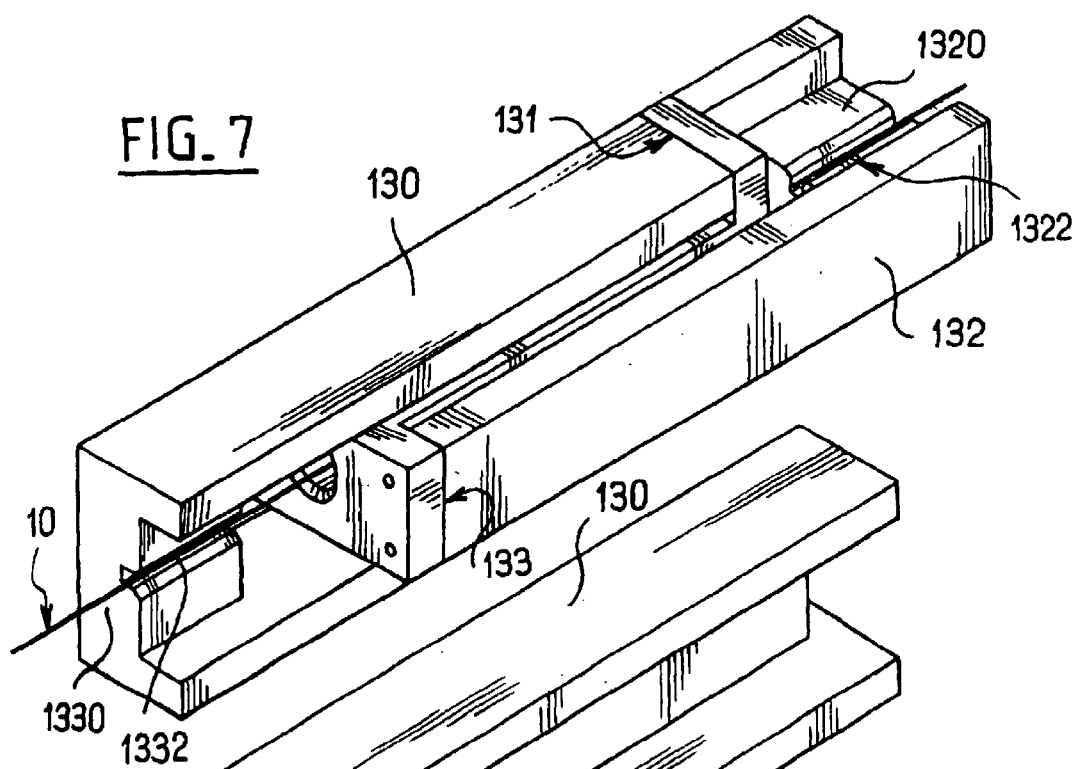
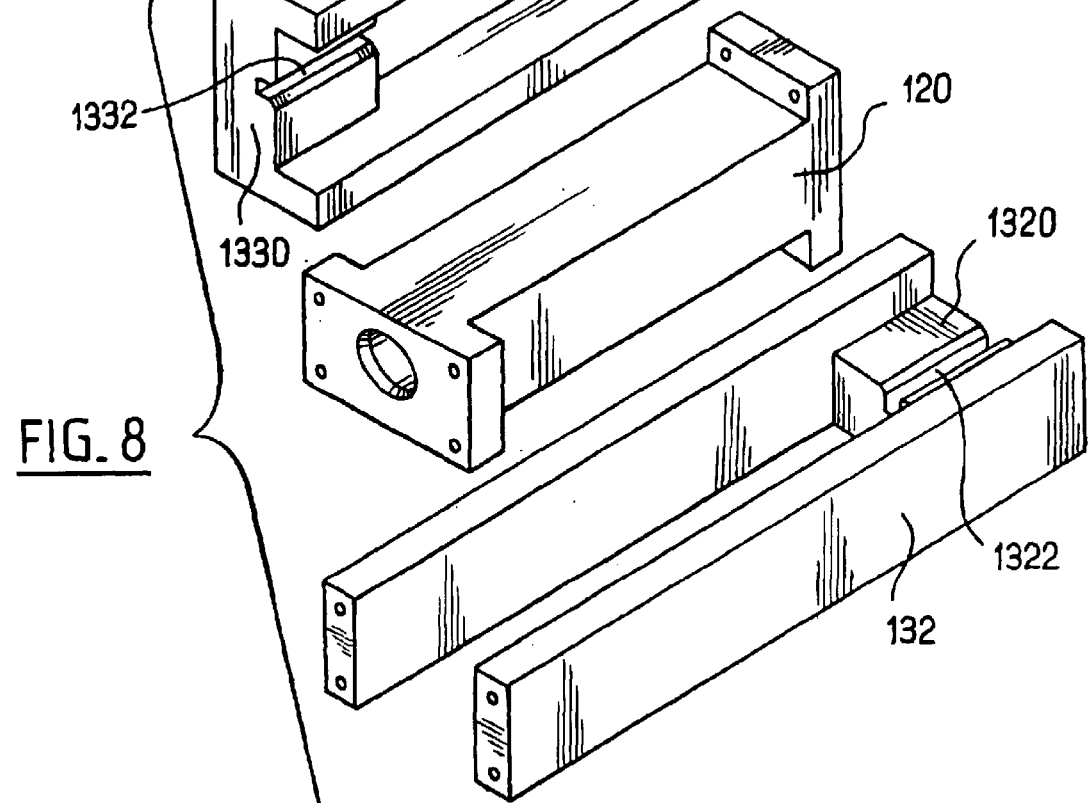

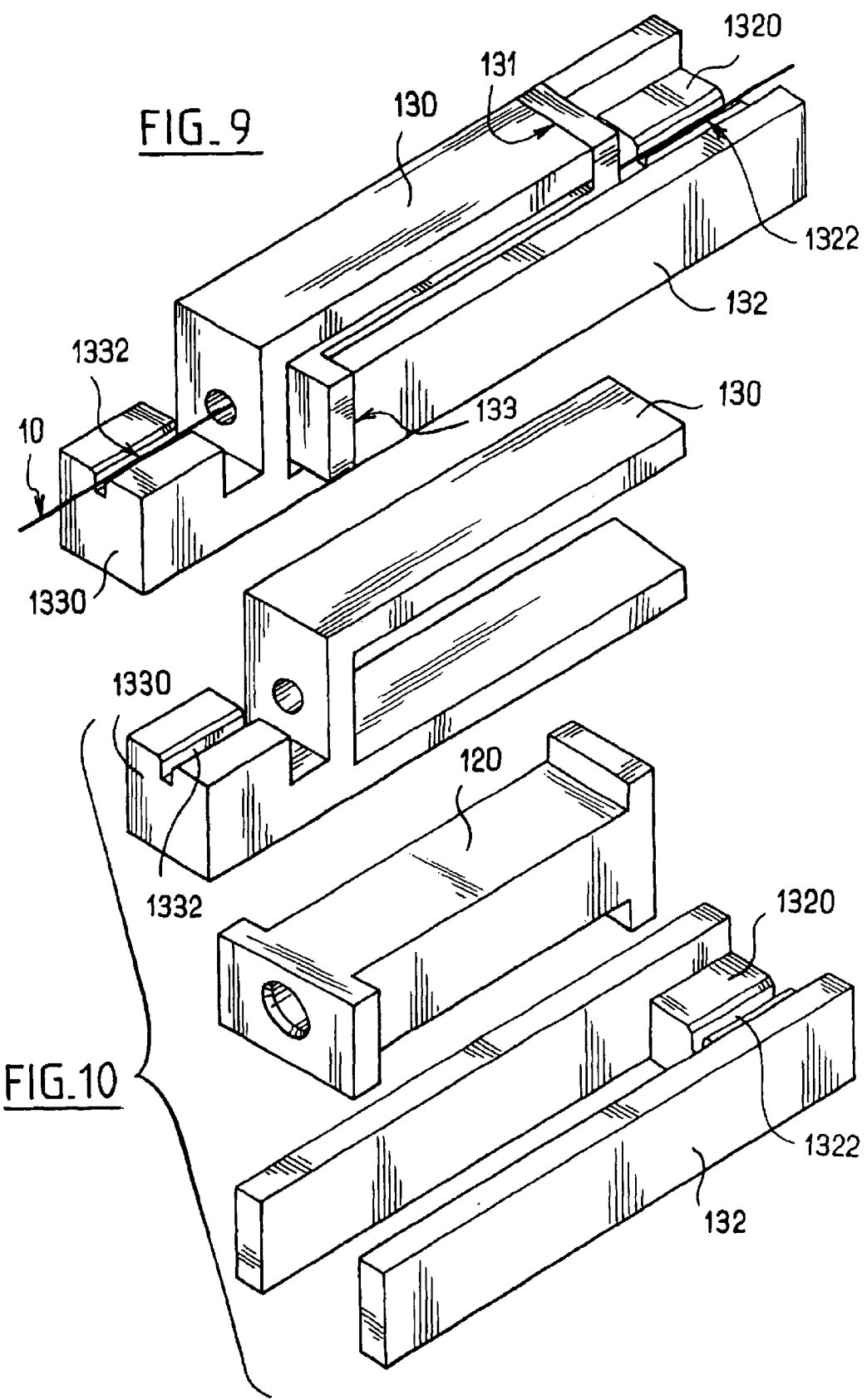

ATHERMAL, OPTICAL-FIBER DEVICE COMPRISING AN INTEGRATED COMPONENT

The present invention relates to the field of optical fibers.

Still more precisely, the present invention relates to the field of optical fibers including an integrated component.

The present invention applies in particular to optical-fiber devices including an integrated Bragg grating. In this context, it aims to propose a device for temperature stabilization and/or adjustment of the Bragg wavelength of the gratings photoinscribed in optical fibers.

Bragg gratings are periodic structures of the optical index, which have the particular feature of reflecting a signal of well-defined wavelength, called Bragg wavelength of the grating. Systems based on Bragg gratings have already given great service, and have given rise to an abundance of literature.

The optical components incorporating such Bragg gratings are used, for example, to manufacture chromatic-dispersion compensating (CDC) filters, gain-equalizer filters (FEG), or Insertion/Extraction Multiplexer (MIE) components.

However, it transpires that the optical filters equipped with an integrated component, in particular with a Bragg grating, are sensitive to temperature. In particular, the properties of the Bragg gratings, and in particular the Bragg wavelength of the gratings, vary:

- as a function of temperature via thermo-optical effects due to the expansion or the compression of the fiber, or to the change of index of the Bragg grating;
- as a function of the traction or the tension to which the Bragg grating is subjected in the fiber.

For optical telecommunications applications, it is vital to ensure stability of operation over a wide temperature range: the Bragg wavelength should vary by less than a few tens of picometers from −40° C. to +80° C., as well as under elevated temperature and humidity conditions: +85° C. with 85% humidity, in the present-day standards. It is also important to be able to adjust the Bragg wavelength of the grating precisely during the assembly (to better than about 50 pm), in order to match it to the required specifications.

Various means have already been proposed for attempting to limit the temperature drift of the devices using Bragg gratings.

One technique consists in controlling the temperature of the fiber by placing the Bragg grating in a climate-controlled enclosure, or by bonding it to a Peltier-effect element. This technique makes it possible to keep the grating at constant temperature. However it is complex, bulky, expensive, consumes energy and cannot always be used.

Certain known devices use a material with a negative thermal-expansion coefficient. Cf. references [1], [2]. However, these devices have not seen much development. In particular, it transpires that the materials with a negative expansion coefficient are difficult to employ, and expensive.

It has been proposed, in particular, to fix a Bragg grating onto a liquid crystalline polymer tube. This technique is applicable especially to gratings several tens of millimeters long. It is known, in fact, that the temperature dependence can be reduced by maintaining the fiber on a polymer the thermal-expansion coefficient of which is negative. Reference will be made on this point to documents [3], [4]. This technique has been tried on the Bragg gratings photoinscribed into optical fibers. A reduction in the temperature shift of the wavelength was obtained. However, the devices using a crystalline polymer tube have, for the moment, reduced the temperature dependence by no more than a factor of 10: typically 0.13 nm/100° C.

Another known device of the "bimetallic plate" type is described in documents [5], [6]. This type of support contains two metal bars which possess different expansion coefficients, $\alpha_1 < \alpha_2$. The bars are fixed together and form a single support. The fiber is bonded to the extremities of the material which expands the least. An initial traction, entailing a slight shift in wavelength, is imposed on the Bragg grating. When the temperature rises, the metal strips curve to one side, with the concavity on the same side as the material $M_1(\alpha_1)$ possessing the smallest thermal-expansion coefficient. The two points, separated by L, which fix the fiber onto the material, come closer together. Thus the initial lengthening applied to the grating will reduce, entailing a reduction in the Bragg wavelength $\lambda_B$ of the grating.

This device does not give complete satisfaction, however.

In particular, with the two materials possessing a different expansion coefficient, it is an intricate matter to guarantee perfect bonding in the temperature range from −40° C. to +80° C.

Other devices are based on the use of differential expansion between two materials.

The means of this type which are in the most common use nowadays are known by the term table-top or semi-table-top layout. A description of exemplary embodiments of these means will be found in documents [7] to [11].

The attached FIGS. 1 and 2 respectively represent table-top and semi-table-top structures in accordance with the state of the art.

The table-top or semi-table-top layouts consist of a beam 20 made of a material with a low expansion coefficient, invar, ceramic, etc., and of one or two studs 30, 32 made of a material with a high expansion coefficient, aluminum for example. The fibers 10 including a Bragg grating are mounted stretched between the two studs 30, 32 in the case of a table-top, or between the stud 30 and the opposite extremity of the beam 20 in the case of a semi-table-top, depending on the type of layout. The fixing points of the fiber 10 are referenced 12 and 14.

In these differential-expansion devices, the total expansion length of the mechanical pieces is equal to the algebraic sum of the relative expansion of each of the pieces. The expansion of each piece is proportional to the thermal-expansion coefficient and to the length of section between the various anchoring points. For example, in a semi-table-top layout as shown diagrammatically in FIG. 3, it is sought to compensate for the thermo-optical effects in the fiber 10 by differential expansion between the stud 30 and the support 20.

In other words, it is sought to balance the terms of the equation:

$$[(Cto/Com)+\alpha_f L_f]\cdot \Delta T = -(\alpha_s \cdot L_s - \alpha_p \cdot L_p)\cdot \Delta T$$

where $\alpha_i$ are the respective thermal-expansion coefficients of the fiber 10, of the support 20 and of the stud 30, $L_f$ the length between the two anchoring points 12, 14 of the fiber, $L_p$ the length between the anchoring point 14 of the fiber 10 on the stud 30 and the anchoring point of the stud 30 on the support 20, and $L_s$ the length between the anchoring points of the fiber 10 on the support 20 and of the stud 30 on the support 20. (Cto/Com) is the ratio between the coefficient of thermo-optical variation Cto of the index of the fiber 10 and the optical-mechanical coefficient Com of variation of the Bragg wavelength as a function of the lengthening of the fiber.

Some of the devices thus known, in particular those using the differential expansion between two materials, have shown themselves to be promising. However, none of them gives complete satisfaction.

The applicant has shown that, for example, in the prior devices, the anchoring point of the elements subjected to expansion, which is formed on a surface parallel to the axis of the fiber, (that is to say the anchoring point between each stud 30, 32 and the beam 20 according to FIG. 1; the anchoring point between the stud 30 and the beam 20 according to FIG. 2), is not precisely defined.

This anchoring point may vary, for example, in the course of the thermal expansion, in the event of variation in temperature, with the ageing of the pieces, or else from one device to another.

And if the anchoring points are poorly defined, the length between the anchoring points varies in consequence. This results in an uncertainty as to the lengths $L_p$ and $L_s$, leading to poor thermal compensation of the device.

FIG. 4 represents a view on an enlarged scale of an anchoring point 31 between a stud 30 and a beam 20, according to the state of the art.

Furthermore, the fixing of the elements to one another (studs 30, 32 on beam 20 especially) remains an intricate problem.

The adhesives have difficulty in resisting the humid-heat conditions required by the standards for qualification of components for optical telecommunications. However, the fiber is placed under slight tension between two fixing points. This tension, although very slight, applies a shear force to the fixings and may entail debonding during temperature cycles with high humidity. Furthermore, the bonding may require stoving of the component for about 24 hours in order to ensure polymerization of the adhesive. Such a process is a constraint in the manufacturing process.

Other methods for linking stud to beam by brazing, welding or screwing are of higher performance, in principle, than bonding. However, these other methods pose problems of mechanical or thermal stress within the core of the beam 20 itself or of the studs 30, 32, which have to react finely to temperature variations. Moreover, they are very expensive.

The object of the present invention is to improve the situation, by proposing a novel device for compensating for the thermal drifts of components integrated onto optical fibers, especially Bragg-grating components.

The object of the present invention is to propose a low-cost but high-performance device.

A further object of the present invention is to propose a device making use of a minimum number of pieces, for example, and not by way of limitation, two pieces, carrying out the function of temperature compensation and fine adjustment of the wavelength.

A further object of the present invention is to propose a device allowing the fiber to be fixed onto two pieces, by bonding, brazing, mechanical pinching or any equivalent means.

Another object of the present invention is to propose a device featuring a reduced bulk.

The abovementioned objectives are achieved, within the context of the present invention, by virtue of an optical-fiber device comprising at least one component integrated into the fiber, and a support assembly on which the fiber is fixed at two points situated respectively on either side of the integrated component, which support comprises at least two elements possessing different thermal-expansion coefficients which are arranged functionally in series between the two points of fixing of the fiber, characterized in that the interface between the two elements possessing different thermal-expansion coefficients is at least substantially perpendicular to the axis of the fiber, and in that the support assembly consists of three pieces arranged in series, in a Z-shaped geometry.

Thus, the present invention proposes a device for thermal stabilization of components integrated onto optical fibers, with controlled differential expansion, of small bulk and with an interface, between two pieces with different thermal-expansion coefficients, which is defined, by construction, with precision. That being so, the device in accordance with the present invention is no longer dependent on the quality of the bonding between these pieces.

Other characteristics, objects and advantages of the present invention will become apparent on reading the detailed description which will follow, and with regard to the attached drawings, given by way of non-limiting examples and on which:

the previously described FIGS. 1 to 4 diagrammatically represent arrangements in accordance with the state of the art, FIG. 5 represents a diagrammatic view in longitudinal axial section of a device in accordance with the present invention, FIG. 6 represents an exploded view of this device, FIG. 7 represents a partial view in perspective of another variant embodiment in accordance with the present invention, FIG. 8 represents an exploded view of this variant, FIG. 9 represents another view in perspective of a variant embodiment of the present invention, and FIG. 10 represents an exploded view of this embodiment variant.

The devices in accordance with the present invention, which are illustrated in FIGS. 5 to 10, essentially comprise a beam 120 and two studs 130, 132 serving as supports for a fiber 10 in which is installed a component 11 such as a Bragg grating. The beam 120 extends essentially parallel to the axis of the fiber 10.

The fiber 10 is fixed, respectively on either side of the component 11, on the studs 130, 132, in the region of fixing points referenced 1322, 1332 respectively.

It will be noted that, in accordance with the present invention, the two studs 130, 132 rest respectively on the extremities of the beam 120. The interface surfaces between the studs 130, 132 and the beam 120, which are referenced 131 and 133, extend perpendicular to the axis of the fiber 10.

In the context of the present invention, the pieces 130 and 132 can be assembled mechanically to the beam 120 by any appropriate means without being obliged either to bond them or to braze them or to weld them or to screw them. It is of importance only, in the context of the invention, that the contact surface 131, 133 between these pieces, two by two, be at least substantially perpendicular to the axis of the fiber 10. In this way, the expansion of the pieces takes place with respect to a precise reference plane perpendicular to the axis of the optical-fiber component.

According to these different embodiment variants, the means for support of the optical fiber, namely the support assembly consisting of three pieces 130, 120 and 132 are arranged in series, in a Z-shaped geometry.

In other words, the two lateral pieces 130, 132 are fixed respectively at 131 and 133 onto opposite extremities of the intermediate beam 120. And the lateral elements 130, 132 extend, from their region of linking 131, 133 onto the intermediate beam 120, toward the opposite extremity thereof.

This configuration can be made use of in a cylindrical architecture as illustrated in FIGS. 5 and 6 or in a more conventional architecture with a straight-line beam, as illustrated in FIGS. 7 to 10.

The embodiments illustrated in FIGS. 5 to 10 exhibit several important characteristics.

On the one hand, according to these variants, the intermediate element 120 preferably exhibits a high thermal-expansion coefficient, while the two lateral elements 131, 132, on the free extremities of which the optical fiber 10 is fixed by any appropriate means, for example by bonding, feature a lower thermal-expansion coefficient.

However, it is also possible to plan the arrangement to be the other way around, that is to say that the element 120 may exhibit a low coefficient, while the elements 131 and 132 exhibit a high coefficient.

By way of non-limiting example, the material with a high thermal-expansion coefficient may be formed from aluminum, while the material with a low thermal-expansion coefficient is made from invar.

Furthermore, the sum of the lengths of the two lateral elements 130 and 132, considered between their region 131, 133 of fixing onto the intermediate element 120 and the regions 1322, 1332 of respective fixing of the optical fiber 10, is greater than the length of the intermediate beam 120 considered between the two fixing regions 131 and 133.

The device thus formed, as illustrated in FIGS. 5 to 10 exhibits numerous advantages with respect to the known prior art.

First of all, the present invention makes it possible to reduce the total length of the assembly. This is because, whereas according to the prior known devices of the table-top or semi-table-top type, the length of the layout is equal to the sum of the length of the optical fiber 10 considered between its two fixing regions and the length of a stud in the case of a semi-table-top layout, or of the two studs in the case of a table-top, according to the invention, the total length of the assembly can be reduced to the length of the optical fiber in question between its two fixing regions.

Moreover, the present invention offers the advantage of making it possible to use a much wider range for the material with a high expansion coefficient, in particular coefficients lower than those used according to the state of the art, because of being placed in the intermediate position of the layout, in such a way that their length is less troublesome. Moreover, the present invention allows greater thermal compatibility between the materials constituting the assembly due to the greater choice and to the convergence of the expansion coefficients. Finally, the present invention allows greater thermal compatibility between the fixing material and the fiber, facilitating the bonding or the brazing thereof, given that, according to the invention, the material of the element on which the optical fiber 10 is fixed no longer exhibits the highest expansion coefficient, but, in contrast, the lowest expansion coefficient, i.e. that closer to the optical fiber 10.

In practice, the elements 130, 120 and 132 making up the support assembly may be the subject of a large number of embodiment variants as to their geometry. These elements will therefore not be described in detail below.

It will be noted, however, that:

in order to allow easy fixing of the optical fiber 10 without undesirable lateral stress on it in the region of its fixing regions, parallel to the axis of the beam 120, at least one of the lateral elements 130, 132 preferably exhibits, at its extremity, a fixing block which is offset laterally with respect to the average longitudinal direction of the element which carries it, so as to come closer to the axis of the assembly and thus to support the optical fiber 10.

Such a block is referenced 1320 in FIGS. 5 and 6, 1320 and 1330 in FIGS. 7 to 10.

especially in the case of a non-cylindrical layout as illustrated in FIGS. 9 and 10, the lateral elements 130 and 132 preferably have generally U-shaped structures framing the central beam 120 along two orthogonal planes, in such a way that the resultant of the traction forces exerted on these elements by the optical fiber 10 are situated along the axis of the layout.

at least some of the elements include through-passages for accommodating the optical fiber 10.

at least some of the lateral elements 130, 132 preferably possess, on their free extremities, longitudinal grooves 1332, 1322 situated along the axis of the layout, for accommodating the optical fiber 10.

Needless to say, the present invention is not limited to the particular embodiments which have just been described, but extends to any variant in accordance with its spirit.

For example, in the context of the present invention, certain embodiments may employ a number of materials, greater than 2, exhibiting different expansion coefficients, such as 3 different materials.

Preferably, in the context of the present invention, provision is also made for means allowing fine adjustment of the wavelength of the Bragg grating for the component 11 integrated into the fiber 10.

Such adjusting means may form the subject of different embodiments.

In essence, they work by altering the distance separating the two points 1322, 1332 for anchoring the fiber.

According to one variant, such adjusting means work by deformation, preferably by bending, of the body 120.

The bending of the body 120 can be controlled by a screw, for example, transverse to the axis of the fiber 10, or equivalent hole means.

According to other variants:

the adjusting means work by relative offsetting of the means 120, 130, 132, serving as points for fixing the fiber, in a direction overall transverse to the axis thereof, this offset can be applied according to two different orthogonal directions, the adjusting means work by axial mechanical deformation of the body 120 (traction or compression).

BIBLIOGRAPHY

[1] WO99/27400

[2] U.S. Pat. No. 5,694,503

[3] T. Iwashima et al. "Temperature compensation technique for fiber Bragg gratings using liquid crystalline polymer tubes" Electronics Letters Online No: 19970289

[4] Jena$^{ER}$ Glaswerk SCHOTT & Gen "Zerodur: In the sum of its properties, a unique glass ceramic"

[5] Pitassi S et al. "Fibre gratings: Temperature and mechanical sensitivity of narrow band transmission filters using different packaging solutions" Sirti S.p.A. Cables and Optical Technologies Italy.

[6] WO98/27446

[7] V. FLEURY "Thermal stabilization of Bragg gratings photoinscribed onto optical fiber"—Course Report of DESS INGENERIE LASER at the University of Sciences and Technologies of Lille.

[8] J. RIOUBLANC et al. "Optimization of a system for passive stabilization of the temperature drift of the tuning wavelength of Bragg gratings"

[9] FR 2772487

[10] FR 2772488
[11] FR 2795528

What is claimed is:

1. Optical-fiber device comprising at least one component (11) intergrated into the fiber (10), and a support assembly on which the fiber (10) is fixed at two points (1322, 1332) situated respectively on either side of the intergrated component (11), which support assembly comprises at least two elements (120, 130, 132) possessing different thermal-expansion coefficients which are arranged functionally in series between the two points of fixing the fiber, wherein an interface (131, 133) between at least two elements (120, 130, 132) possessing different thermal-expansion coefficients is at least substantially perpendicular to the axis of the fiber (10), and the support assembly includes three pieces (130, 120 and 132) arranged in series, in a Z-shaped geometry said device further comprising:

means for adjusting the distance separating two points (1322, 1332) for anchoring the fiber (10) onto the support assembly (120, 130) by deformation of said support assembly, wherein the adjusting means comprise a screw transverse to the axis of the fiber (10).

2. Device according to claim 1, wherein the component (11) integrated into the fiber (10) is formed by a Bragg grating.

3. Device according to claim 1, wherein the support assembly comprises a beam (120) and two studs (130, 132) which rest on the extremities of the beam (120), the fiber (10) in which is implanted a component (11) such as a Bragg grating being fixed, respectively on either side of the component (11), on the studs (130, 132), the interface surfaces between the studs (130, 132) and the beam (120), extending at least substantially perpendicular to the axis of the fiber (10).

4. Device according to claim 3, characterized in that the beam (120) on the one hand and, on the other hand, each stud (130, 132), are produced from materials featuring different thermal-expansion coefficients.

5. Device according to claim 4, characterized in that the beam (120) is formed from a material with a low expansion coefficient, while each stud (130, 132) is produce from material(s) with a high thermal expansion coefficient.

6. Device according to claim 4, characterized in that the beam (120) is produced from a material with a high expansion coefficient while each stud (130, 132) is produced from material with a low thermal-expansion coefficient.

7. Device according to claim 4, characterized in that the material with a high thermal-expansion coefficient is formed from aluminum, while the material with a low thermal-expansion coefficient is made of invar.

8. Device according to claim 1, wherein that two lateral pieces (130, 132) are fixed respectively onto opposite extremities of an intermediate beam (120), the lateral elements (130, 132) extend, from their region of linking (131, 133) onto the intermediate beam (120) toward the opposite extremity thereof.

9. Device according to claim 8, characterized in that the intermediate element (120) exhibits a high thermal-expansion coefficient, while the two lateral elements (131, 132), on the free extremities of which the optical fiber (10) is fixed by any appropriate means, for example by bonding, feature a lower thermal expansion coefficient.

10. Device according to claim 8, characterized in that the sum of the lengths of the two lateral elements (130 and 132), considered between their region (131, 133) of fixing onto the intermediate element (120) and the regions of respective fixing of the optical fiber (10), is greater than the length of the intermediate beam (120) considered between its two fixing regions (131 and 133).

11. Device according to claim 8, characterized in that at least one o the lateral elements (130, 132) exhibits, at its extremity, a fixing block which is offset laterally with respect to the average longitudinal direction of the element which carries it, so as to come closer to the axis of the assembly and thus to support the optical fiber (10).

12. Device according to claim 8, characterized in that at least one of the lateral elements (130 and 132) has a generally U-shaped structure framing the central beam (120), in such a way that the resultant of the traction forces exerted on this element by the optical fiber (10) are situated along the axis of the layout.

13. Device according to claim 1, wherein at least some of the elements include through passages for accommodating the optical fiber (10).

14. Device according to claim 8, characterized in that at least some of the lateral elements (130, 132) possess, on their free extremities, longitudinal grooves (1332, 1322) situated along the axis of the layout, for accommodating the optical fiber (10).

15. Device according to claim 1, wherein the support assembly (120, 130) has a cylindrical configuration.

16. Device according to claim 1, wherein said screw is adapted to deform by bending said support assembly.

* * * * *